United States Patent [19]
Kruglikov et al.

[11] Patent Number: 6,105,026
[45] Date of Patent: Aug. 15, 2000

[54] MULTI-PHASE LOCKING FOR PARTITION MAINTENANCE OPERATIONS

[75] Inventors: Andre Kruglikov, Atherton; Elizabeth Davis, Palo Alto; Gianfranco Putzolu, San Francisco, all of Calif.

[73] Assignee: Oracle Corporation, Redwood City, Calif.

[21] Appl. No.: 08/887,963

[22] Filed: Jul. 3, 1997

[51] Int. Cl.[7] .................................................... G06F 17/30
[52] U.S. Cl. ............................................... 707/8; 707/200
[58] Field of Search .................................. 707/8, 10, 100, 707/103, 200–204

[56] References Cited

U.S. PATENT DOCUMENTS

| | | | |
|---|---|---|---|
| 5,161,227 | 11/1992 | Dias et al. | 709/104 |
| 5,535,375 | 7/1996 | Eshel et al. | 395/500.48 |
| 5,623,659 | 4/1997 | Shi et al. | 707/8 |
| 5,642,501 | 6/1997 | Doshi et al. | 707/8 |
| 5,649,200 | 7/1997 | LeBlang et al. | 395/703 |
| 5,664,186 | 9/1997 | Bennett et al. | 707/204 |
| 5,666,532 | 9/1997 | Saks et al. | 707/205 |
| 5,675,762 | 10/1997 | Bodin et al. | 711/206 |
| 5,692,178 | 11/1997 | Shaughnessy | 707/8 |
| 5,890,153 | 3/1999 | Fukuda et al. | 707/8 |
| 5,897,638 | 4/1999 | Lasser et al. | 707/102 |

OTHER PUBLICATIONS

J. Gray and A. Reuter, Transaction Processing Concepts and Techniques, Morgan Kaufman Publishers, 1993, ISBN–1–55860–190–2, pp. 406–416;Table of Contents (vii–xxi);Index (pp. 1047–1070).

*Primary Examiner*—Maria N. Vonbuhr
*Attorney, Agent, or Firm*—Lyon & Lyon LLP

[57] ABSTRACT

A method and apparatus for multi-phase locking for partition maintenance operations. In the first phase, a shared data dictionary lock is acquired on a body of metadata in a data dictionary. Next, the data dictionary is read and a list of affected partitions is generated. In the second phase, an intent exclusive data lock is acquired on the affected table. Next, an exclusive data lock is acquired on the affected partitions of the affected table. The shared data dictionary lock on the data dictionary is released and a physical attribute of the data of the affected partitions is changed. In the third phase, an exclusive data dictionary lock is acquired on the data dictionary. The metadata associated with the affected partitions in the data dictionary is updated and the exclusive data locks on the affected partitions and the intent exclusive data lock on the affected table are released. Finally, the exclusive data dictionary lock on the data dictionary is released. As a result of performing multi-phase locking for partition maintenance operations, the scope of resources locked is reduced and the efficiency of the partition maintenance operations, from a concurrency point of view, is increased.

38 Claims, 5 Drawing Sheets

TABLE 100

PARTITIONING KEY 102

PARTITION 110

| ID # | LAST NAME | FIRST NAME | HIRE DATE |
|---|---|---|---|
| 1 | JACKSON | PAUL | 900401 |
| 2 | BUSTILLO | CONNIE | 900501 |
| 3 | CHAN | GARY | 900715 |
| 4 | GREEN | MIKE | 900818 |
| 5 | LAPIN | ALVIN | 901124 |

PARTITION 120

| 6 | HARE | MONICA | 910102 |
|---|---|---|---|
| 7 | CHAPMAN | DAVE | 910114 |
| 8 | TYLER | JEAN | 910213 |
| 9 | SNYDER | LORRY | 910225 |
| 10 | WEST | BOB | 910601 |

PARTITION 130

| 12 | BLACK | JAMES | 920201 |
|---|---|---|---|
| 13 | TALBOTT | FRITZ | 920601 |
| 14 | PELTON | ALICIA | 920803 |
| 15 | DROPPO | JAMES | 920902 |
| 16 | NANDA | ATUL | 921113 |

*FIG. 1*
*(PRIOR ART)*

MULTI-PHASE LOCKING FOR PARTITION MAINTENANCE OPERATIONS

FIELD OF THE INVENTION

The present invention relates to database systems, and more specifically to operations performed on partitions.

BACKGROUND OF THE INVENTION

When a database system has very large tables consisting of potentially millions of rows, for example, it is desirable to divide the tables into subtables ("partitions") of a more manageable size. Creating partitions in a table can have positive effects on table maintenance and query processing.

One method for specifying the partitions of a table is by "range" partitioning. When using range partitioning, a range of column values (partitioning key values) are associated with each partition and determine which record belongs to which partition.

FIG. 1 illustrates an exemplary table 100 with corresponding partitions 110, 120 and 130. A partitioning key 102 is used to determine which record belongs in which partition. In the particular example shown in FIG. 1, the partitioning key 102 is a date field (HIRE DATE) and the rows in partitions 110, 120 and 130 of table 100 are grouped together by date.

FIG. 2 illustrates an exemplary data dictionary 210 on a disk 200. Metadata (data about the data) is contained in a data dictionary 210. The data dictionary 210 typically has many tables in it. For example, the data dictionary 210 keeps a table 212 that stores data about each of the columns of table 100, a table 214 that stores data about each of the indexes for table 100 and a table 216 that stores data about each of the partitions 110, 120 and 130 of table 100. The table 216 that stores data about the partitions, for example, contains three records, one record for each partition 110, 120 and 130. The record for a given partition contains data such as the beginning and ending boundaries of the partition and a pointer to the storage device on which the partition is located.

Each attribute associated with an object in a database system may be classified as either a logical attribute or a physical attribute. Logical attributes are those attributes that are visible to an application programmer or end user. For example, the number of columns in a table is a logical attribute of the table. If a logical attribute of an object is changed, then an application program that uses the object may have to be modified.

Physical attributes are those attributes that are not visible to an application programmer or end user. For example, the storage location of the data for a table is a physical attribute. A change to a physical attribute of an object is typically transparent to applications and end users. Consequently, an application program that uses an object typically does not have to be modified in response to changes in the physical attributes of the object.

The partitions for a particular table in a database system have the same logical attributes, such as the same column definitions, but may have quite different physical attributes. For example, the partitions of a table may reside on different physical devices in a network (i.e., the different partitions may reside on physically separate disk drives in the database system).

A partition maintenance operation is an operation that affects the definition of a partitioned table and/or one or more partitions of the partitioned table. For example, a partition maintenance operation may be used to add a new partition to an existing table or to move a partition to a different storage device. Data definition language statements such as ADD PARTITION, SPLIT PARTITION, MOVE PARTITION, DROP PARTITION and MERGE PARTITION are examples of partition maintenance operations. Partition maintenance operations should only affect the physical attributes of a table, and not impact the overall logical appearance of a table.

Locking mechanisms are employed in a database system to manage concurrent access to the data and the metadata in a database system. One type of lock is a data lock. A data lock is a lock acquired on a body of data. A second type of lock is a data dictionary lock. A data dictionary lock is a lock acquired on a body of metadata in a data dictionary.

There are also different modes of locks. For instance, a shared lock is acquired on an object by a user or process before the user or process reads from the object. A shared lock may be acquired on an object by multiple users or processes. An exclusive lock, however, is acquired by a single user or process on an object and is acquired before the user or process writes to the object. (Of course, an exclusive lock held by a user or process on an object will also allow reads from the object by the user or process holding the exclusive lock.)

During a partition maintenance operation, users may have to be blocked from trying to access or modify the data of the affected table 100 and from trying to access or modify the metadata associated with the affected table 100 in the data dictionary 210. Access may have to be blocked because accessing or modifying the data in the affected table 100 or the metadata associated with the affected table 100 in the data dictionary 210 could result in errors for other user processes, corrupted data in the table 100 or corrupted metadata in the data dictionary 210 (depending on the particular partition maintenance operation).

One possible solution to this problem is to exclusively lock both the metadata associated with the affected table 100 in the data dictionary 210 and the affected table 100 containing the partitions affected by the partition maintenance operation for the entire duration of the partition maintenance operation. FIG. 3 depicts a series of steps associated with single-phase locking for partition maintenance operations.

For example, assume a partition maintenance operation MOVE PARTITION 110 from disk 200 to a disk 250 is initiated using the single-phase locking method depicted in FIG. 3.

First, an exclusive data dictionary lock is acquired on the metadata associated with the affected table 100 in the data dictionary 210 in step 305. In step 310, an exclusive data lock is acquired on the affected table 100. Next, in step 315, the partition maintenance operation is performed. After the partition maintenance operation is performed in step 315, the exclusive data lock on the affected table 100 is released in step 320. Finally, in step 325, the exclusive data dictionary lock on the metadata associated with the affected table 100 in the data dictionary 210 is released.

While the partition maintenance operation MOVE PARTITION 110 is being performed, assume a second partition maintenance operation MOVE PARTITION 120 from disk 200 to a disk 260 is initiated. Using the single-phase locking method described above, all the metadata associated with the affected table 100 in the data dictionary 210 and all the data in the affected table 100 are exclusively locked for the duration of the first partition maintenance operation. Thus, the second partition maintenance operation will be blocked from accessing any of the metadata associated with the affected table 100 in the data dictionary 210 and any of the data in the affected table 100 until after the first operation releases its exclusive locks on the resources, even though concurrent execution of the second operation will not cause any ill effects on the metadata associated with the affected table 100 in the data dictionary 210 or the affected table 100.

In essence, the single-phase locking method is a conservative measure that prevents potential errors by disabling concurrent access to the data in the affected table 100 and the metadata associated with the affected table 100 in the data dictionary 210 and, consequently, to all the partitions (110, 120 and 130) of the affected table 100 during a partition maintenance operation.

A problem with the single-phase method is that it may be inefficient, from a concurrency point of view, to exclusively lock all of the data in the affected table 100 and all of the metadata associated with the affected table 100 in the data dictionary 210 for an entire partition maintenance operation. For example, some of the activity performed during the partition maintenance operation may be of a particular type such that allowing concurrent access to other partitions of the affected table 100 would not result in errors or corrupted data or metadata. Some of these "safe" activities could be performed while the partition maintenance operation is executing. Accordingly, the use of exclusive locks (data or data dictionary) at a table level during the entire time a partition maintenance operation is running would cause other processes or users to wait for the locked resources, even during the portions of the partition maintenance operation which "safely" allow concurrent access. Thus, there is a need for a more efficient method for locking resources when performing partition maintenance operations.

SUMMARY OF THE INVENTION

A method and apparatus for multi-phase locking of a partitioned body of data when performing partition maintenance operations is provided.

According to the method, a first phase comprises the steps of acquiring a first lock on at least a body of metadata associated with all the partitions referenced in the partition maintenance operation, reading the body of metadata and generating a list of partitions affected by a partition maintenance operation. A second phase comprises the steps of acquiring a data lock on the affected partitions in a table, releasing the first lock on the body of metadata and changing a physical attribute of the data in the affected partitions in the table. A third phase comprises the steps of acquiring a second lock on at least a body of metadata associated with all the partitions affected by the partition maintenance operation, updating the metadata in the data dictionary, releasing the data lock and releasing the second lock on the body of metadata.

In one embodiment, a cost based analysis is performed to determine whether a single-phase locking method or a multi-phase locking method should be performed.

As a result of performing multi-phased locking for partition maintenance operations, the scope of the data locked will be reduced for the duration of the partition maintenance operation. In particular, other operations can read, write and perform partition maintenance operations on partitions not affected by other concurrently running partition maintenance operations since the present invention allows for data locks to be more selectively placed upon the affected partitions. In addition, the present invention allows for the metadata associated with the affected partitions in the data dictionary to be locked in exclusive mode for a shorter length of time than in a single-phase locking method. The net result is a more efficient resource locking method that allows more partition maintenance operations to be concurrently scheduled than does a single-phase locking method, and also it allows additional read or write operations on other partitions not affected by a concurrently executing partition maintenance operation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of a partitioned table;

DETAILED DESCRIPTION OF THE PREFERRED EMBODIMENT

A method and apparatus for multi-phase locking for partition maintenance operations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 4:
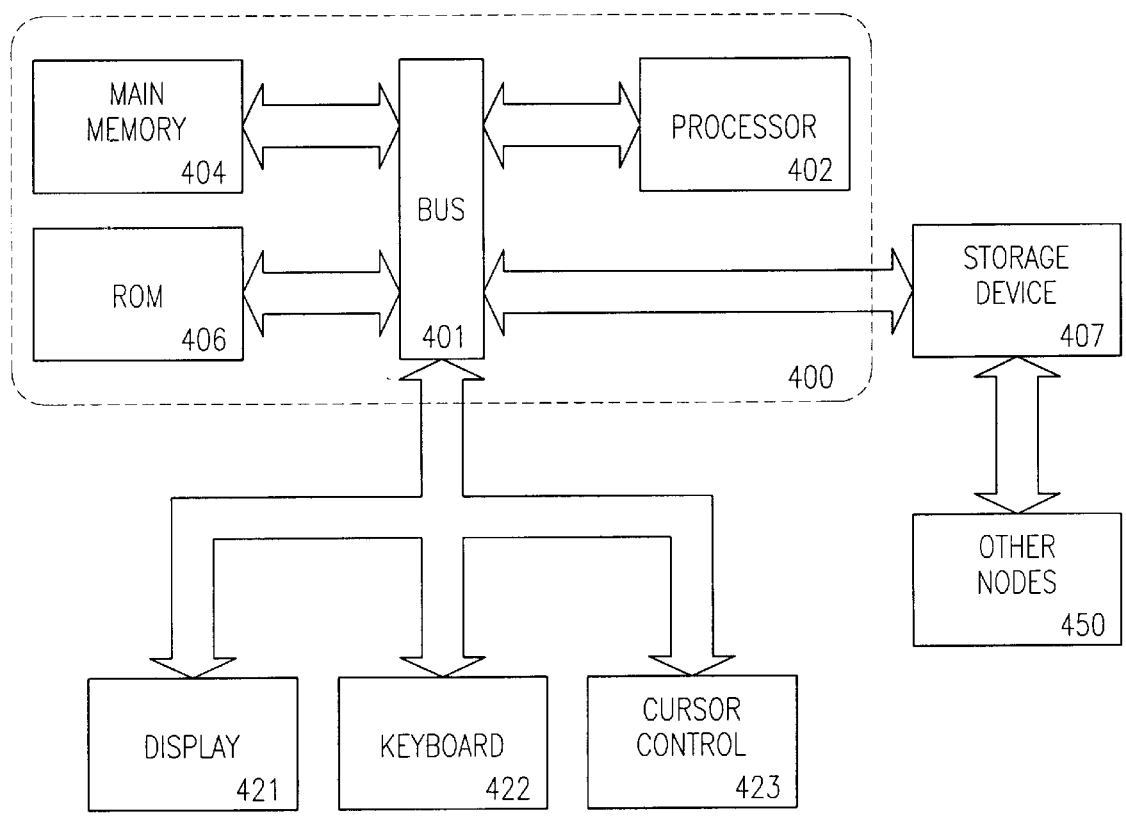
FIG. 4 is a block diagram of a computer system that may be used to implement an embodiment of the invention.

Referring to FIG. 4, it is a block diagram of a computer system 400 upon which an embodiment of the present invention can be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402. Data storage device 407, for storing information and instructions, is connected to bus 401.

A data storage device 407 such as a magnetic disk or optical disk and its corresponding disk drive can be coupled to computer system 400. Computer system 400 can also be coupled via bus 401 to a display device 421, such as a cathode ray tube (CRT), for displaying information to a computer user. Computer system 400 further includes a keyboard 422 and a cursor control 423, such as a mouse.

The present invention is related to the use of computer system 400 to perform multi-phase locking for partition maintenance operations. According to one embodiment, multi-phase locking is performed by computer system 400 in response to processor 402 executing sequences of instructions contained in memory 404. Such instructions may be read into memory 404 from another computer-readable medium, such as data storage device 407. Execution of the sequences of instructions contained in memory 404 causes processor 402 to perform the process steps that will be described hereinafter. In alternative embodiments, hardwired circuitry may be used in place of or in combination with software instructions to implement the present invention. Thus, the present invention is not limited to any specific combination of hardware circuitry and software.

Functional Description

As used herein, the "granularity" of a lock refers to the size of the unit protected by a lock. Thus, a coarse granularity lock refers to a lock that is used to control access to a large object (e.g. a table), whereas a fine granularity lock refers to a lock that is used to control access to a small object (e.g. a partition of the table). Multiple-granularity locking protocols are protocols that control access to a database system resource by locks that vary in scope. For example, access to a row may be protected by obtaining a row-level lock on the row, or by obtaining a table-level lock on the table that contains the row.

Modes of locks include: a shared lock, an intent shared lock, an exclusive lock and an intent exclusive lock. An "intent" locking mode signals intent to acquire a finer granularity lock. For instance, an intent shared lock signals intent to acquire a finer granularity shared lock, whereas an intent exclusive lock signals intent to acquire a finer granularity exclusive lock. Thus, before acquiring an exclusive lock on a small component of a large object (e.g. a partition in a table), a first step is acquiring an intent exclusive lock on the large object (e.g. the table). An intent mode lock on an object prevents other processes or users from acquiring a non-compatible mode of lock on the object.

In a multiple-granularity locking protocol, an intent mode lock is first acquired on a large object if a finer granularity lock is to be acquired on a small object contained in the large object. The intent locking propagates "down" from the large object to each successively smaller object in an object's hierarchy. For example, if the first record of partition 110 of table 100 is to be locked in exclusive mode, then an intent exclusive data lock is acquired on table 100, then an intent exclusive data lock is acquired on partition 110 of table 100 and finally, an exclusive data lock is acquired on the first record of partition 110 of table 100.

A multiple-granularity locking protocol is used in the preferred embodiment of the present invention. Methods and protocols for implementing multiple-granularity locking are disclosed in *Transaction Processing: Concepts and Techniques,* J. Gray and A. Reuter, Morgan Kaufman Publishers, 1993, ISBN-1-55860-190-2, which is incorporated herein by reference.

Phase One

Figure 5:
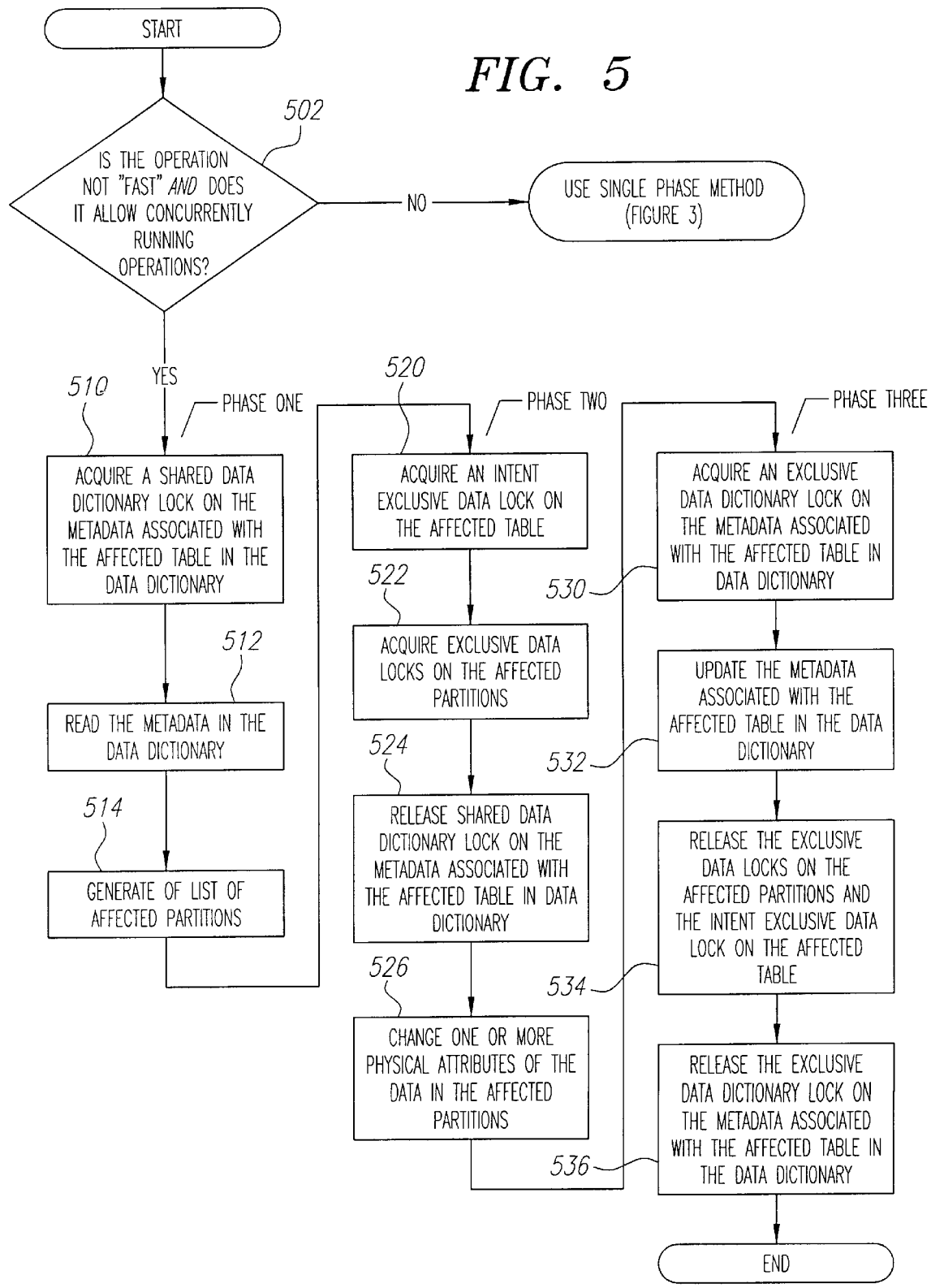
FIG. 5 is a flowchart illustrating the steps of multi-phase locking for partition maintenance operations according to the preferred embodiment of the invention.

FIG. 5 depicts a series of steps for performing multi-phase locking for partition maintenance operations according to the preferred embodiment of the invention. In step 502, a test is performed to determine whether multi-phase locking is to be used to perform a partition maintenance operation. In the embodiment illustrated in FIG. 5, multi-phase locking is used if (1) the partition maintenance operation is not a "fast" partition maintenance operation, and (2) the partition maintenance operation type offers the possibility of running other operations concurrently.

According to one embodiment of the invention, the partition maintenance operation is considered "fast" if its expected duration is not affected by the size, or number of records, of the objects on which it operates. In general, fast operations result in data dictionary changes and do not cause a data scan or a data update. Fast operations are also expected to complete in a relatively short amount of time. For example, ADD PARTITION and RENAME PARTITION are typically fast operations, whereas MOVE PARTITION and SPLIT PARTITION are typically not fast operations.

Table 1 is a truth table showing the logic behind step 502. In Table 1, "Not Concurrent" means that the partition maintenance operation does not allow the possibility of concurrent operations, "Concurrent" means that the partition maintenance operation does allow the possibility of concurrent operations, "Not Fast" means the partition maintenance operation is not fast, "Fast" means the partition maintenance operation is fast, "S" means perform a single-phase locking method and "M" means perform a multi-phase locking method.

TABLE 1

|  | Not Fast | Fast |
| --- | --- | --- |
| Not Concurrent | S | S |
| Concurrent | M | S |

If, in response to step 502, the partition maintenance operation is determined to be a fast operation or if the partition maintenance operation does not offer the possibility of running other operations concurrently, then the single-phase locking method described above (with reference to FIG. 3) is used to perform the partition maintenance operation. If the partition maintenance operation matches the criteria of step 502, then the process continues to step 510.

Figure 2:
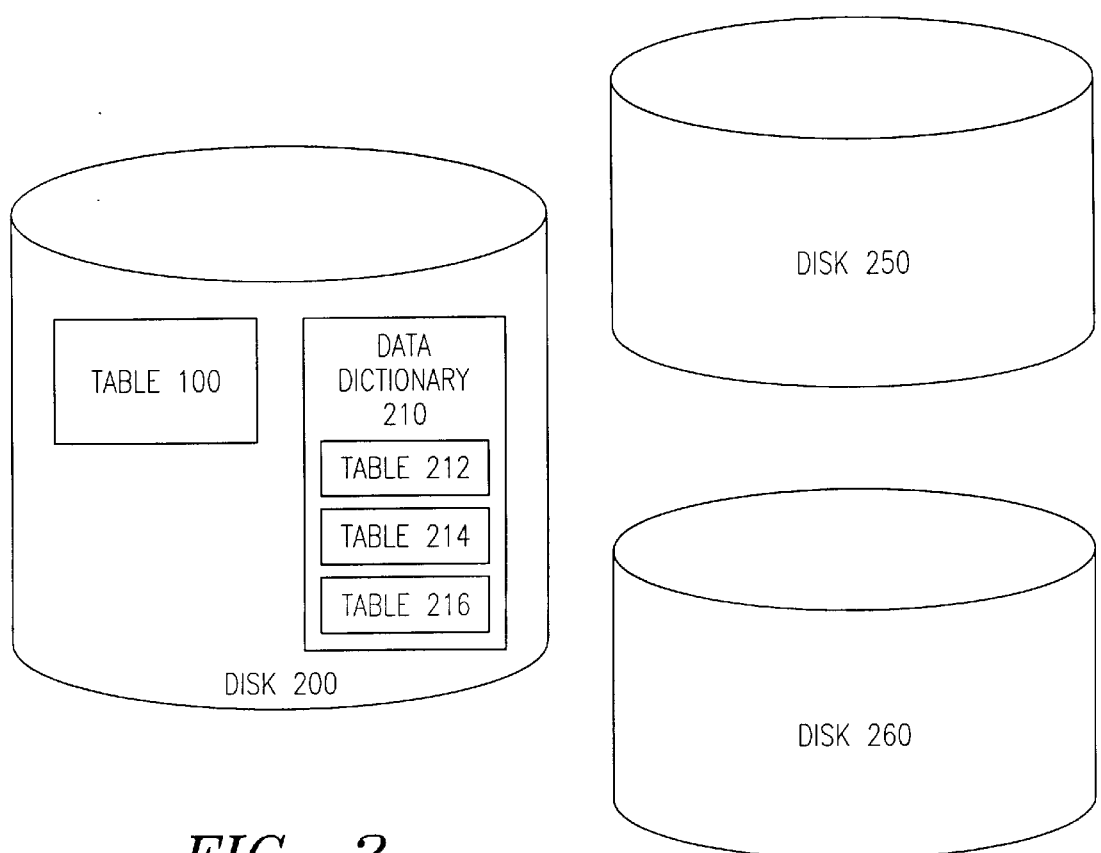
FIG. 2 is a block diagram of a plurality of storage devices, an exemplary table and a data dictionary.
Figure 3:
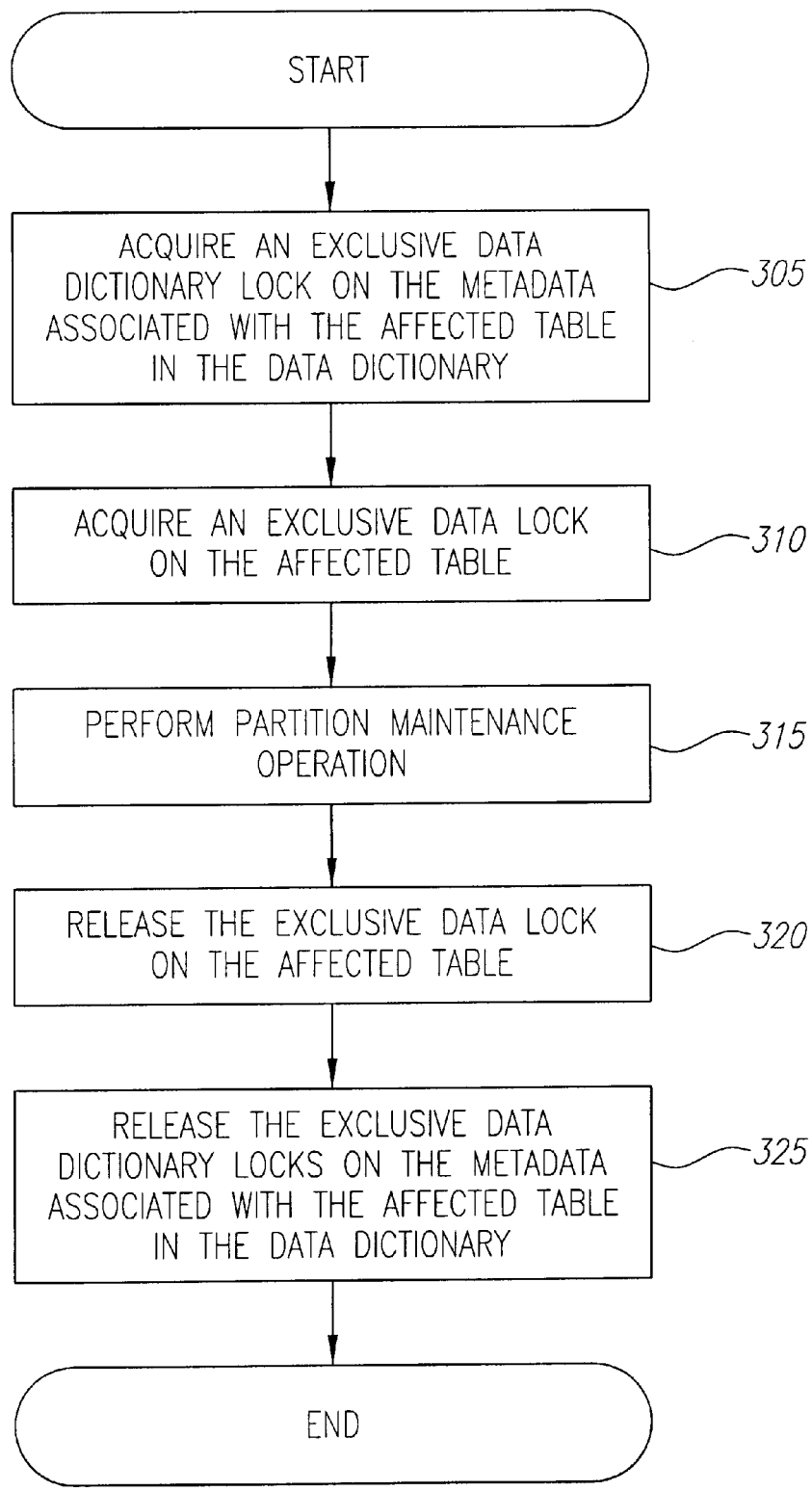
FIG. 3 is a flowchart illustrating the steps of a single-phase locking for partition maintenance operations.

In an alternative embodiment, a cost based analysis can be performed on the partition maintenance operation based upon the truth table depicted in Table 1. However, in the alternative embodiment, instead of performing the multi-phase locking method, the cost based analysis is performed. If the cost of performing the partition maintenance operation is less than a user defined threshold value, then the single-phase locking method depicted in FIG. 3 is used. Otherwise, control passes to step 510 and a multi-phase locking method is used.

In step 510, a shared data dictionary lock is acquired on the metadata associated with the affected table 100 in the data dictionary 210. After the shared data dictionary lock is acquired, the metadata is read from data dictionary 210 in step 512. The metadata read from the data dictionary 210 includes information about the physical attributes of each partition in the affected table 100 (e.g., a storage device 407 location, a set of disk blocks providing permanent storage for the partition, the partitioning key 102, and an upper partition bound and a lower partition bound for each partition). Next, in step 514, a list of affected partitions is generated based upon the metadata read from the data dictionary 210 and the partition maintenance operation.

For example, if a first partition maintenance operation MOVE PARTITION 110 from disk 200 to disk 250 is initiated employing the methods described above, then the first partition maintenance operation would be tested, in step 502, to determine if it is not a fast operation and if it would allow a concurrently running operation. As a result of testing, the first partition maintenance operation is found to not be fast and to allow other concurrently running operations, so step 510 is performed.

In step 510, a shared data dictionary lock is acquired on the metadata associated with the affected table 100 in the data dictionary 210. Next, in step 512, the metadata in the data dictionary 210 is read and in step 514, a list of affected partitions, based upon the first partition maintenance operation and the metadata read in step 512, is generated. In this instance, the list of affected partitions is comprised of partition 110.

Phase Two

In step 520, an intent exclusive data lock is acquired on the affected table 100. In step 522, exclusive data locks are acquired (based on the list of affected partitions from step 514) on the affected partitions in table 100. Next, in step 524, the shared data dictionary lock on the metadata associated with the affected table 100 in the data dictionary 210 (locked in step 510) is released, thus allowing a second concurrent operation to acquire an exclusive data dictionary lock on the metadata associated with the affected table 100 in the data dictionary 210.

In step 526, the partition maintenance operation is performed. During the performance of the partition maintenance operation, one or more physical attributes of the data associated with the affected partitions in table 100 are changed (which may cause manipulation of all the data in the affected partitions).

Continuing the MOVE PARTITION 110 example started in Phase One, in step 520, an intent exclusive data lock is acquired on table 100. Using the list of affected partitions generated in step 514, an exclusive data lock is acquired on partition 110 in step 522. Next, in step 524, the shared data dictionary lock on the metadata associated with the affected table 100 in the data dictionary 210 (locked in step 510) is released. In step 526, the affected rows of partition 110 are moved from disk 200 to disk 250. Assume that step 526 for the first operation takes seven hours to complete.

Phase Three

In step 530, an exclusive data dictionary lock is acquired on the metadata associated with the affected table 100 in the data dictionary 210. Next, in step 532, the metadata associated with table 100 in the data dictionary 210 (locked in step 530) is updated. After step 532, the exclusive data locks on the affected partitions of table 100 and the intent exclusive data lock on the affected table 100 are released in step 534, thereby allowing other operations to have concurrent access to the data in the released partitions. Finally, in step 536, the exclusive data dictionary lock on the metadata associated with the affected table 100 in the data dictionary 210 is released.

In an alternative embodiment, beginning at step 530, an intent exclusive data dictionary lock is acquired on the metadata associated with the affected table 100 in the data dictionary 210. Next, exclusive data dictionary locks are acquired on the metadata associated with the affected partitions of table 100 in the data dictionary 210. Next, the metadata of the affected partitions of table 100 in the data dictionary 210 is updated. In the next step, the exclusive data locks on the affected partitions of table 100 and the intent exclusive data lock on the affected table 100 are released. Next, the exclusive data dictionary locks on the metadata associated with the affected partitions of table 100 in the data dictionary 210 are released. Finally, the intent exclusive data dictionary lock on the metadata associated with the affected table 100 in the data dictionary 210 is released.

Continuing the MOVE PARTITION 110 example from Phase Two, in step 530, an exclusive data dictionary lock is acquired on the metadata associated with the affected table 100 in the data dictionary 210. Next, the metadata associated with the affected table 100 in the data dictionary 210 is updated in step 532 and the exclusive data lock on the partition 110 and the intent exclusive data lock on the affected table 100 are released (step 534). In step 536, the exclusive data dictionary lock on the metadata associated with the affected table 100 in the data dictionary 210 (locked in step 530) is released. The first partition maintenance operation is now completed.

A Second Partition Maintenance Operation

Assume in the example above that immediately after the first partition maintenance operation MOVE PARTITION 110 is initiated, a second partition maintenance operation MOVE PARTITION 120 from disk 200 to a disk 260 is initiated. The second operation is also not a fast operation and does allow concurrently running operations, so the multi-phase technique, beginning at step 510, is used for the second operation.

In step 510, a shared data dictionary lock is acquired on the metadata associated with affected table 100 in the data dictionary 210. Next, in step 512, the metadata associated with affected table 100 in the data dictionary 210 is read and in step 514, a list of affected partitions, based upon the second partition maintenance operation and the metadata read in step 512, is generated. In this instance, the list of affected partitions is comprised of partition 120.

In step 520, an intent exclusive data lock is acquired on the table 100. Using the list of affected partitions generated in step 514, an exclusive data lock is acquired on the partition 120 in step 522. Next, in step 524, the shared data dictionary lock on the metadata associated with affected table 100 in the data dictionary 210 (locked in step 510) is released. In step 526, the affected rows of partition 120 are moved from disk 200 to disk 260. Assume that step 526 for the second operation takes six hours to complete.

Comparing the completion time of step 526 for the first operation (seven hours) and the completion time of step 526 for the second operation (six hours), it is clear that the second operation will reach step 530 before the first operation reaches step 530. Because the second operation reaches step 530 first, it will acquire an exclusive data dictionary lock on the metadata associated with the affected table 100 in the data dictionary 210 before the first operation. If the first operation reaches step 530 before the second operation releases the exclusive data dictionary lock, then the first operation will wait at step 530 until the first operation can obtain an exclusive data dictionary lock on the metadata associated with the affected table 100 in the data dictionary 210.

In step 530, an exclusive data dictionary lock is acquired on the metadata associated with the affected table 100 in the data dictionary 210. The metadata associated with the affected table 100 in the data dictionary 210 is updated in step 532 and the exclusive data lock on the partition 120 and the intent exclusive data lock on the affected table 100 are released (step 534). In step 536, the exclusive data dictionary lock on metadata associated with the affected table 100 in the data dictionary 210 (locked in step 530) is released. The second partition maintenance operation is now completed.

In the two examples described above, in conjunction with the preferred embodiment, a significant time savings is realized by performing multi-phase locking for partition maintenance operations versus performing single-phase locking of partition maintenance operations. If the single-phase locking method depicted in FIG. 3 was performed, the two partition maintenance operations would have to be performed serially, thus the operations would take approximately thirteen hours to complete. Using the multi-phase locking method depicted in FIG. 5, the two partitions maintenance operations can operate substantially concurrently, thus taking approximately seven hours to complete. Further, in the multi-phase locking method all of the data in the partitions unaffected by a partition maintenance operation is available all of the time, which is not the case in the single-phase locking method.

In the foregoing specification, the invention has been described with reference to specific embodiments thereof. It will, however, be evident that various modifications and changes may be made thereto without departing from the broader spirit and scope of the invention. For instance, the partitions depicted in FIG. 1 show range partitioning of the records in table 100, however, the methods described herein would also apply to other methods for partitioning (e.g., hash partitioning and round robin partitioning). Also, in the preferred embodiment, an intent mode locking protocol is employed, however, other locking protocols that allow a multiple-granularity locking could also be employed. Finally, for purposes of explanation, the invention was described in three distinct phases each comprising of a plurality of steps. Alternative embodiments could add additional steps or move steps from one phase to another without substantively modifying the invention described herein. The specification and drawings are, accordingly, to be regarded in an illustrative rather than a restrictive sense.

What is claimed is:

1. A method for performing an operation on a partitioned object, wherein said operation changes a physical attribute of one or more partitions of said partitioned object, the method comprising the steps of:

acquiring a lock on a body of metadata associated with said one or more partitions;

acquiring a data lock on said one or more partitions;

while holding said data lock on said one or more partitions, releasing said lock on said body of metadata;

changing said physical attribute of said one or more partitions; and releasing said data lock on said one or more partitions.

2. The method of claim 1, further comprising the steps of:

acquiring a second lock on said body of metadata associated with said one or more partitions;

updating said body of metadata; and releasing said second lock on said body of metadata.

3. The method of claim 2, wherein:

said step of acquiring said second lock on said body of metadata comprises the step of acquiring an exclusive data dictionary lock on a subset of said body of metadata; and said step of releasing said second lock on said body of metadata comprises the step of releasing said exclusive data dictionary lock on said subset of said body of metadata.

4. The method of claim 2, wherein said step of acquiring said second lock on said body of metadata comprises the step of acquiring an exclusive data dictionary lock on said body of metadata.

5. The method of claim 1, wherein said method further comprises the steps of:

reading said body of metadata; and generating a list of affected partitions, wherein said affected partitions are partitions that will be affected by said operation.

6. The method of claim 5 wherein:

said step of acquiring said data lock comprises the step of acquiring an exclusive data lock on said one or more partitions that belong to said list of affected partitions; and said step of releasing said data lock comprises the step of releasing said exclusive data lock on said one or more partitions that belong to said list of affected partitions.

7. The method of claim 1, wherein:

said step of acquiring said data lock on said one or more partitions comprises the step of acquiring an exclusive data lock on said one or more partitions; and said step releasing said data lock on said one or more partitions comprises the step of releasing said exclusive data lock on said one or more partitions.

8. The method of claim 1, wherein said step of acquiring said lock on said body of metadata comprises the step of acquiring a shared data dictionary lock on said body of metadata.

9. The method of claim 1, further comprising the step of determining whether said operation should be performed using a single-phase locking technique or a multi-phase locking technique based upon a type of said operation.

10. The method of claim 1, further comprising the steps of:

determining a cost associated with said operation; and determining whether said operation should be performed using a single phase-locking technique or a multi-phase locking technique based upon said cost.

11. A method for performing an operation on a partitioned object, wherein said operation changes a physical attribute of one or more partitions of said partitioned object, the method comprising the steps of:

acquiring a first lock on a body of metadata associated with said one or more partitions;

acquiring a data lock on said one or more partitions;

while holding said data lock on said one or more partitions, releasing said first lock on said body of metadata;

changing said one or more partitions;

acquiring a second lock on said body of metadata;

updating said body of metadata;

releasing said data lock on said one or more partitions; and releasing said second lock on said body of metadata.

12. The method of claim 11, wherein said method further comprises the steps of:

reading said body of metadata; and generating a list of affected partitions, wherein said affected partitions are partitions that will be affected by said operation.

13. The method of claim 12, wherein:

said step of acquiring said data lock on said one or more partitions comprises the step of acquiring an exclusive data lock on said one or more partitions that belongs to said list of affected partitions; and said step of releasing said data lock on said one or more partitions comprises the step of releasing said exclusive data lock on said one or more partitions.

14. The method of claim 11, wherein:

said step of acquiring said data lock on said one or more partitions comprises the step of acquiring an exclusive data lock on said one or more partitions; and said step of releasing said data lock on said one or more partitions comprises the step of releasing said exclusive data lock on said one or more partitions.

15. The method of claim 11 wherein:

said step of acquiring said second lock on said body of metadata comprises acquiring an exclusive data dictionary lock on a subset of said body of metadata; and said step of releasing said second lock on said body of metadata comprises releasing said exclusive data dictionary lock on said subset of said body of metadata.

16. The method of claim 11, wherein said step of acquiring said first lock on said body of metadata comprises the step of acquiring a shared data dictionary lock on said body of metadata.

17. The method of claim 11, wherein said step of acquiring said second lock on said body of metadata comprises the step of acquiring an exclusive data dictionary lock on said body of metadata.

18. The method of claim 11, further comprising the step of determining whether said operation should be performed using a single-phase locking technique or a multi-phase locking technique based upon a type of said operation.

19. The method of claim 11, further comprising the steps of:

determining a cost associated with said operation; and determining whether said operation should be performed using a single phase-locking technique or a multi-phase locking technique based upon said cost.

20. A computer readable medium having stored thereon sequences of instructions for performing an operation on a partitioned object, wherein said operation changes a physical attribute of one or more partitions of said partitioned object, said sequences of instructions including instructions for performing the steps of:

acquiring a lock on a body of metadata associated with said one or more partitions;

acquiring a data lock on said one or more partitions;

while holding said data lock on said one or more partitions, releasing said lock on said body of metadata;

changing said physical attribute of said one or more partitions; and releasing said data lock on said one or more partitions.

21. The computer readable medium of claim 20, said sequences of instructions further including instructions for performing the steps of:

acquiring a second lock on said body of metadata associated with said one or more partitions;

updating said body of metadata; and releasing said second lock on said body of metadata.

22. The computer readable medium of claim 21, wherein:

said step of acquiring said second lock on said body of metadata comprises the step of acquiring an exclusive data dictionary lock on a subset of said body of metadata; and said step of releasing said second lock on said body of metadata comprises the step of releasing said exclusive data dictionary lock on said subset of said body of metadata.

23. The computer readable medium of claim 21, wherein said step of acquiring said second lock on said body of metadata comprises the step of acquiring an exclusive data dictionary lock on said body of metadata.

24. The computer readable medium of claim 20, said sequences of instructions further including instructions for performing the steps of:

reading said body of metadata; and generating a list of affected partitions, wherein said affected partitions are partitions that will be affected by said operation.

25. The computer readable medium of claim 24 wherein:

said step of acquiring said data lock comprises the step of acquiring an exclusive data lock on said one or more partitions that belong to said list of affected partitions; and said step of releasing said data lock comprises the step of releasing said exclusive data lock on said one or more partitions that belong to said list of affected partitions.

26. The computer readable medium of claim 20, wherein:

said step of acquiring said data lock on said one or more partitions comprises the step of acquiring an exclusive data lock on said one or more partitions; and said step releasing said data lock on said one or more partitions comprises the step of releasing said exclusive data lock on said one or more partitions.

27. The computer readable medium of claim 20, wherein said step of acquiring said lock on said body of metadata comprises the step of acquiring a shared data dictionary lock on said body of metadata.

28. The computer readable medium of claim 20, said sequences of instructions further including instructions for performing the step of determining whether said operation should be performed using a single-phase locking technique or a multi-phase locking technique based upon a type of said operation.

29. The computer readable medium of claim 20, said sequences of instructions further including instructions for performing the steps of:

determining a cost associated with said operation; and determining whether said operation should be performed using a single phase-locking technique or a multi-phase locking technique based upon said cost.

30. A computer readable medium having stored thereon sequences of instructions for performing an operation on a partitioned object, wherein said operation changes a physical attribute of one or more partitions of said partitioned object, said sequences of instructions including instructions for performing the steps of:

acquiring a first lock on a body of metadata associated with said one or more partitions;

acquiring a data lock on said one or more partitions;

while holding said data lock on said one or more partitions, releasing said first lock on said body of metadata;

changing said one or more partitions;

acquiring a second lock on said body of metadata;

updating said body of metadata;

releasing said data lock on said one or more partitions; and releasing said second lock on said body of metadata.

31. The computer readable medium of claim 30, said sequences of instructions further including instructions for performing the steps of:

reading said body of metadata; and generating a list of affected partitions, wherein said affected partitions are partitions that will be affected by said operation.

32. The computer readable medium of claim 31, wherein:

said step of acquiring said data lock on said one or more partitions comprises the step of acquiring an exclusive data lock on said one or more partitions that belongs to said list of affected partitions; and said step of releasing said data lock on said one or more partitions comprises the step of releasing said exclusive data lock on said one or more partitions.

33. The computer readable medium of claim 30, wherein:

said step of acquiring said data lock on said one or more partitions comprises the step of acquiring an exclusive data lock on said one or more partitions; and said step of releasing said data lock on said one or more partitions comprises the step of releasing said exclusive data lock on said one or more partitions.

34. The computer readable medium of claim 30 wherein:

said step of acquiring said second lock on said body of metadata comprises acquiring an exclusive data dictionary lock on a subset of said body of metadata; and said step of releasing said second lock on said body of metadata comprises releasing said exclusive data dictionary lock on said subset of said body of metadata.

35. The computer readable medium of claim 30, wherein said step of acquiring said first lock on said body of metadata comprises the step of acquiring a shared data dictionary lock on said body of metadata.

36. The computer readable medium of claim 30, wherein said step of acquiring said second lock on said body of metadata comprises the step of acquiring an exclusive data dictionary lock on said body of metadata.

37. The computer readable medium of claim 30, said sequences of instructions further including instructions for performing the step of determining whether said operation should be performed using a single-phase locking technique or a multi-phase locking technique based upon a type of said operation.

38. The computer readable medium of claim 30, said sequences of instructions further including instructions for performing the steps of:

determining a cost associated with said operation; and determining whether said operation should be performed using a single phase-locking technique or a multi-phase locking technique based upon said cost.

* * * * *